H. G. REIST.
BEARING.
APPLICATION FILED APR. 5, 1917.
1,430,850.
Patented Oct. 3, 1922.
2 SHEETS—SHEET 1.
Fig. 1.
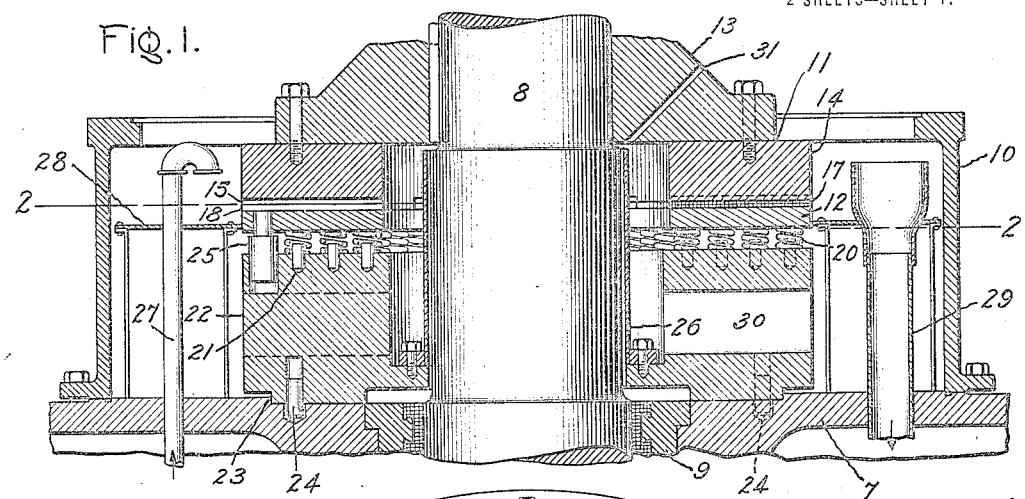
Fig. 2.
Fig. 3.
Fig. 3a.
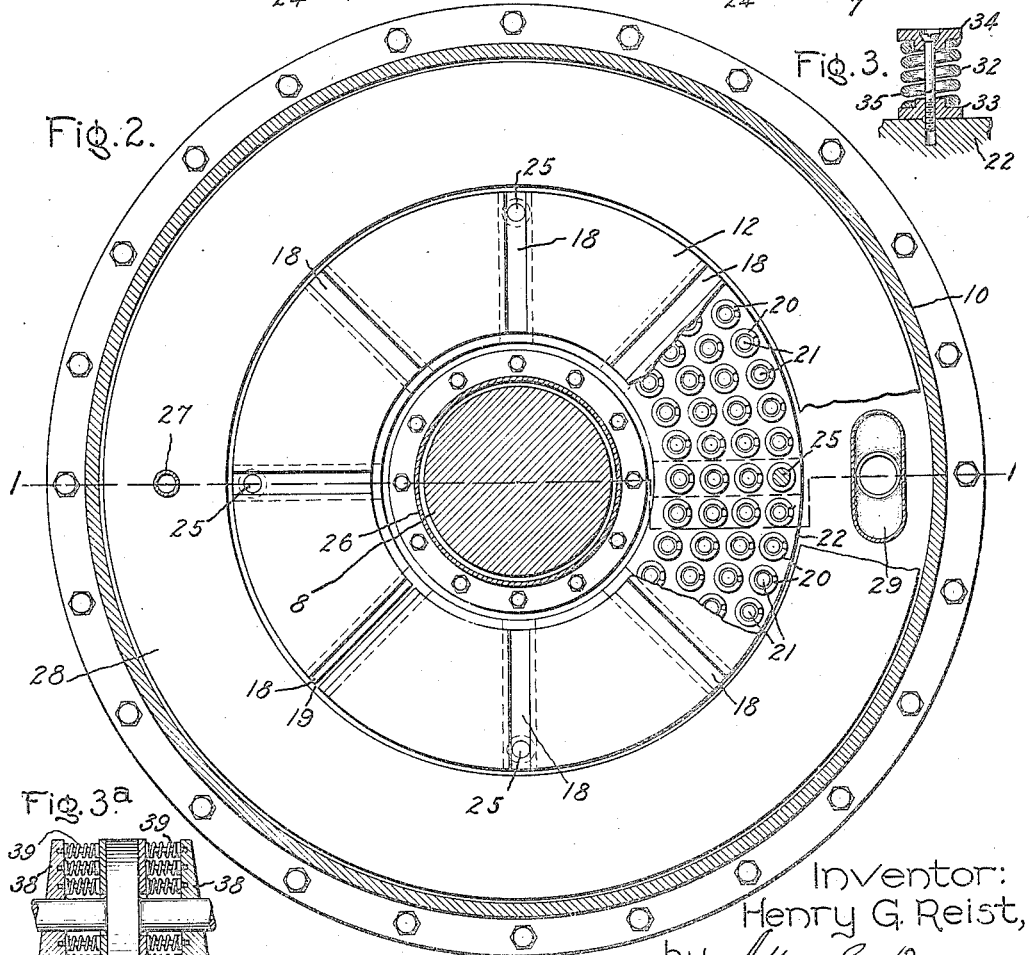
Inventor:
Henry G. Reist,
by Albert G. Davis
His Attorney.

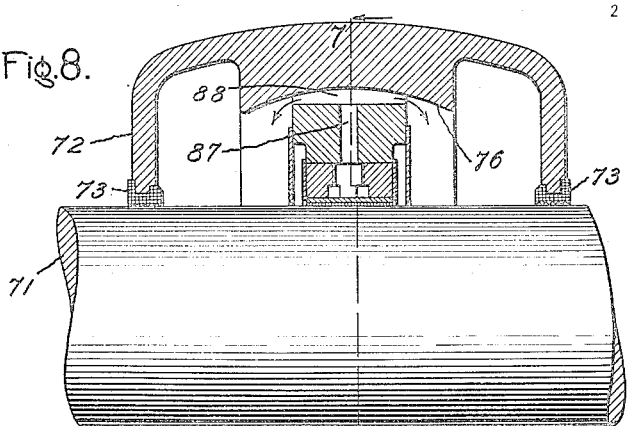
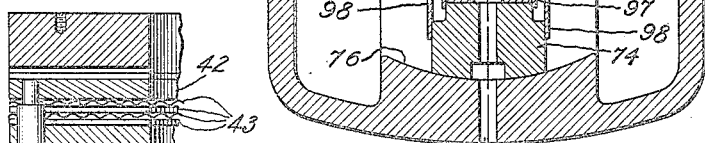
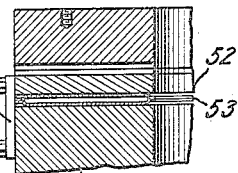
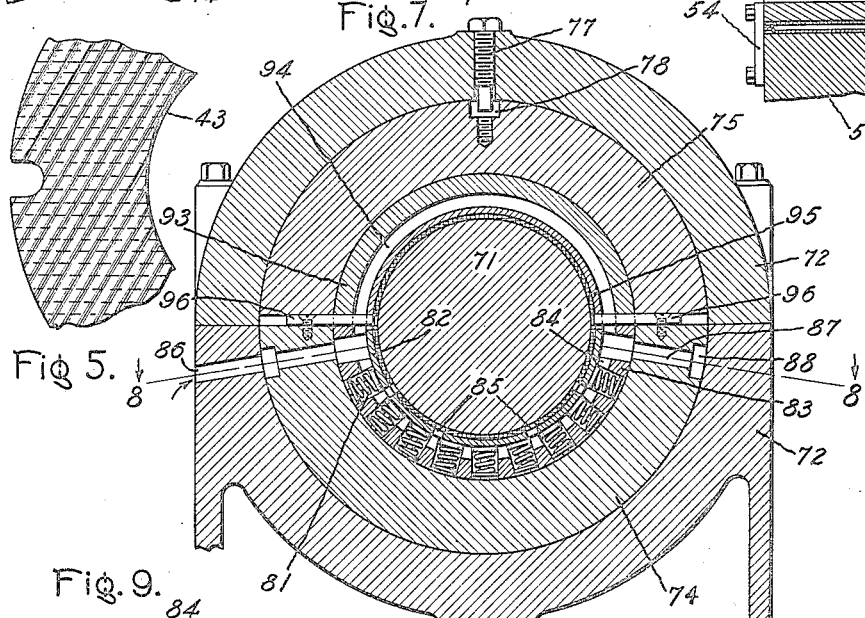
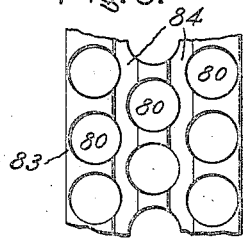
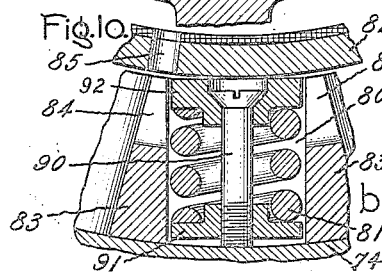

Patented Oct. 3, 1922.

1,430,850

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

BEARING.

Application filed April 5, 1917. Serial No. 159,976.

*To all whom it may concern:*

Be it known that I, HENRY G. REIST, a citizen of the United States, residing at Schenectady, in the county of Schenectady, State of New York, have invented certain new and useful Improvements in Bearings, of which the following is a specification.

My invention relates to bearings, my object being to secure satisfactory service under even the severest conditions of heavy load or of high bearing pressure.

While the failure of bearings when the average load per square inch of bearing surface exceeds a certain value may be explained in various ways, in general, nevertheless, it seems to be due to uneven distribution of the total load over the bearing surface in such wise that it is virtually concentrated on a few spots of very limited area,—the rest of the surface carrying practically no load whatever. Such concentration may result from various causes,—such as irregularities or warping of the relatively moving bearing surfaces, imperfect alignment, etc.; and the local pressures to which it gives rise may be as much as a hundred or more times the average pressure determined by dividing the total load by the total area. It is under these extreme local pressures that the initial cutting, crushing, or other damage leading to failure of the bearing surfaces actually occurs; and it has really been from the necessity of keeping down these concentrated pressures that in practice the average bearing pressure has been limited to values such as 50 to 150 lbs. per square inch, for example,—values far below the actual crushing strength of bearing materials.

I have found that the average bearing pressure can safely be raised considerably above the limits heretofore observed. This I accomplish by construction of the bearing so as to distribute the pressure more uniformly than heretofore and to minimize and limit the concentration of pressure, so that each portion of the surface shall always carry a fair share of the load and extreme disproportion between average and maximum pressure shall be impossible. This I do by providing that at least one of the relatively moving bearing members may yield or give at any portion of its bearing surface when the pressure materially exceeds the average pressure, in such a way that excessive pressure on it that might otherwise arise from any cause shall be relieved by transfer of at least part of the load to other portions of the surface. Bearings constructed in accordance with my invention will operate satisfactorily under loads as high as three or four hundred pounds to the square inch, or even double that; whereas ordinary bearings fail when far lower limits of pressure are exceeded.

I have obtained my best results by means of a flexible bearing member yieldingly supported or mounted so that its bearing surface may "give" or adjust itself locally as may be necessary to compensate for any unevenness or warping in the surface of the bearing member in contact with it. A flexible bearing member thus supported will also adjust itself as a whole so as to compensate for imperfect alignment, etc., of the other bearing member. These compensatory functions it performs far better than could any rigid bearing member, however mobile as a whole.

The uniformity of bearing pressure despite irregularities of bearing surface attained by my invention allows the bearing area to be reduced to the minimum compatible with the inherent properties of available bearing materials and available lubricants, and so favors compactness and the minimizing of friction losses; increases the loads that can be carried without forced lubrication or risk of heating; renders extreme accuracy in the machining and finishing of surfaces unnecessary; and allows the newly assembled bearing to be run without special attention at the start. These features all reduce the cost of manufacture and operation. My invention also admits of great simplicity of construction, which still further reduces the cost of manufacture and upkeep; in particular, it not only permits the elimination of the costly spherical seats heretofore indispensable in many cases, but performs all the functions of such seats in a far more effective and satisfactory manner.

I have hereinafter illustrated and described thrust or step bearings suitable for vertical water-wheel generators and for marine propeller-shafts, and also a journal bearing suitable for a horizontal steam turbo-alternator. While, however, these are the best embodiments of my invention at present known to me, and while the invention extends even to the specific features and details herein set forth, yet the invention is not confined to such specific features and details, nor to bearings of these particular types, but can be otherwise carried out and applied, and can be employed in bearings between moving parts as well as in those between moving and stationary parts.

In the accompanying drawings, Fig. 1 is a vertical section of one form of thrust bearing embodying my invention, taken on the line 1—1 of Fig. 2; and Fig. 2 is a plan view with certain parts in section on the line 2—2 of Fig. 1 and the parts above that line removed.

Fig. 3 is a fragmentary sectional view illustrating a modified arrangement of one of the parts shown in Figs. 1 and 2; and Fig. 3$^a$ is a somewhat diagrammatic detail view (partly in vertical section) illustrating the application of the arrangement of Fig. 3 to a marine propeller shaft or the like.

Fig. 4 is a fragmentary vertical section of a modified form of bearing, the portion shown corresponding to the lefthand side of the bearing in Fig. 1; and Fig. 5 is a fragmentary plan view of certain parts that appear in section in Fig. 4.

Fig. 6 is a fragmentary vertical section (similar to Fig. 4) of still another form of bearing.

Fig. 7 is a transverse section of a journal bearing embodying my invention, taken on the line 7—7 of Fig. 8, as seen from the right; Fig. 8 is a section taken on the line 8—8 of Fig. 7, as seen from above; Fig. 9 is an enlarged fragmentary plan view of one of the parts shown in section in Figs. 7 and 8; and Fig. 10 is an enlarged fragmentary section illustrating in detail certain parts shown in Fig. 7.

Referring, now, to Figs. 1 and 2, there is shown the upper portion or wall of a generator housing 7 in which the vertical generator shaft 8 is journaled by means of the ordinary guide bearing 9. The step or thrust bearing of my invention is mounted on the housing 7 and surrounded by a casing 10 bolted or otherwise secured to said housing.

The step bearing comprises relatively rotating upper and lower bearing structures or members 11 and 12 in rubbing contact with one another and receiving the bearing load or pressure (in this case the end thrust of the shaft 8) one from the other. The upper bearing structure 11 which rotates with the shaft 8 is relatively rigid and inflexible, consisting of a collar part 13 suitably secured to the shaft and an annular bearing part or member proper 14 bolted to said collar part. The annular bearing part or member 14 may be of close-grained cast-iron somewhat harder than cylinder iron, such as 50% iron and 50% steel, or of case hardened steel, or of any other suitable metal. It is ground and polished or otherwise finished with a flat rubbing surface or face, and is shown as having in its face a number of radial oil-grooves 15. The lower bearing structure or member 12 is shown as rendered flexible by being made in the form of a thin, flat ring of any suitable metal, such as boiler plate or other mild steel, and as having a flat bearing surface 17 of Babbitt or other anti-friction metal with a number of oil-grooves 18 similar to the grooves 15 of the part 14. For an annular bearing member 12 with an outside diameter of 40″ and a face 10″ wide, the thickness may be about 1¼″,–1″ boiler plate and ¼″ Babbitt, or less, which will give a good degree of flexibility. At the bottom of one of the grooves 18 the member 12 is sawed or otherwise cut through (as at 19) to facilitate expansion and contraction and minimize warping. If preferred the flexible member 12 may be made in two or more segments for convenience in assembling and taking apart the bearing. If desired, the oil-grooves may be omitted from one of the bearing members 14 and 12.

It is intended, in the bearing shown, that the flexible bearing member 12 should give or yield locally at any portion of its bearing surface, and the supporting means associated with it is accordingly adapted to afford the diffusely distributed yielding support necessary to permit this. As shown, this supporting means comprises a large number of helical springs 20 arranged so close together that they in effect constitute an elastic cushion beneath said member 12. These springs may be of such strength as to deflect 0.1″ for a load amounting to 1500 or 1600 lbs. per spring, which would be a fair normal running load for a bearing of the dimensions mentioned above. The springs 20 are loosely fitted about projecting pins 21 in the upper surface of an annular block or "base ring" 22, and this base ring 22 fits within a rabbet 23 in the upper side of the housing 7 and is kept from turning by a number of pins 24. The bearing member 12 is guided in its up and down movement under variations of loading, etc., and held against rotation or displacement, by means of a number of keys or dowel pins 25 which are seated in the base ring 22 in any approved manner.

The support afforded by the cushion of springs 20 is, of course, not only yielding, but resilient as well, so that the flexible member 12 will "come back" or "take" locally throughout its bearing surface as well as "give," as is necessary in order that every portion shall always carry its share of the load.

An oil tight circular dam 26 mounted about the shaft 8 in a recess in the base ring 22 coacts with the base ring, the housing 7, and the casing 10 to form a tank for lubricant in which the bearing may run immersed. Lubricant enters the tank through an inflow pipe 27 which discharges above a horizontal baffle plate 28 (adapted to prevent surging) and leaves the tank through an overflow pipe 29. After finding its way downward around the baffle 28, the lubricant flows inward amongst the springs 20 and through the radial passages 30 in the base ring 22 to the space about the dam 26. It then flows outward through the oil grooves 15 and 18 of the bearing members 14 and 12. Viscosity and the centrifugal force due to the rotation of the member 14 insure a free supply of lubricant to the bearing surfaces. Omission of the oil-grooves from one of the members 14 and 12 (as above suggested) will not materially affect the lubrication of the bearing surfaces as just described.

The guide bearing 9 is intended to be lubricated independently.

The lubricating system is not an essential part of my present invention, and may be altered as circumstances may require.

Reference has been made above to the fact that under their normal running load the springs 20 will be compressed and deflected about 0.1″. Ordinarily most of this deflection will occur when the machine to which the bearing belongs is being set up; and it may not vary afterward until the machine comes to be taken apart,—except a little as the hydraulic conditions change in the water turbine. Often times a deflection of such a magnitude and a corresponding endwise movement of the shaft 8 would be of no practical consequence: there may, however, be cases in which the load on the bearing is liable to be imposed and removed very suddenly,—or even reversed,—and in which the resulting endwise shift of the shaft would be disastrous. An example is the thrust bearing of a marine propeller shaft directly driven by a steam turbine,— the end thrust of the steam on the turbine rotor being balanced against the end thrust of the propeller. Here a slight endwise shift of the shaft on stopping, starting, or reversing, or when the propeller races (owing to the pitching of the vessel), might result in a complete stripping of the turbine blades, since no slip-joint could be interposed between the bearing and the turbine.

Now such deflection of the springs 20 by the normal load and the accompanying endwise movement of the shaft 8 is entirely unessential to their intended function in the bearing, which requires no more than an almost infinitesimal compression of some springs with an accompanying expansion of others,—usually without any accompanying endwise shift of the shaft at all. In cases where such deflection is objectionable, it can be avoided by initially confining the springs under a tension or deflection equal to or slightly exceeding that corresponding to the normal load, so that they will not be deflected at all until the normal load is so far exceeded that their intended function in protecting the bearing surface from undue local concentration of pressure ought to come into play. For this purpose, the springs may be mounted and arranged as shown in enlarged detail in Fig. 3.

As here shown, each spring 32 has associated with it a pair of abutments 33 and 34 and a screw or bolt 35. The screw 35 is threaded through the abutment 33, and its head rests at the bottom of a countersink in the abutment 34. The springs 32 are to be arranged and distributed like the springs 20 of Figs. 1 and 2, the lower end of each screw 35 lying in a hole in the base ring 22 and serving the purpose of the pins 21 of Figs. 1 and 2, and the bearing member 12 resting on top of the abutments 34. In some cases the ends of the screws 35 may be loose in their holes in the base ring 22; in others, it may be desirable to have them screwed in, so as to hold the springs 32 securely in place. Before or after being put in place, each spring will be compressed to a tension of about 1500–2000 lbs. (for a bearing loaded as described in connection with Figs. 1 and 2) by proper adjustment of the screw 35 in the abutment 33, and the upper surface or face of the abutment 34 may be accurately ground off, so that for all the springs the distance between the faces of the abutments 33 and 34 shall be the same. Obviously the support afforded by the springs 32 will be firm and unyielding to the normal bearing pressure, but will yield to pressure materially in excess of normal, so that for practical purposes the flexible bearing member will behave exactly as in Figs. 1 and 2.

Fig. 3ª shows a construction suitable for the "thrust block" of a marine propeller shaft, or for any other situation where the thrust is liable to reversal and end play is objectionable. This consists essentially of a pair of the bearings of Fig. 1 facing in opposite directions, with the springs of each bearing mounted and arranged with interconnected abutments as shown in Fig. 3. As shown, the propeller shaft carries a rigid collar or flange 36 with both its faces adapted to serve as bearing surfaces. At opposite sides of the flange 36 are flexible annular bearing members 37, 37 (each of which may be cut in half for convenience in assembling) and rigid blocks 38, 38 (suitably secured and tied into the structure of the ship); and between each of the flexible bearing members 37, 37 and the corresponding block 38 are interposed the individually pretensioned helical springs 39.

In the modified embodiment of the invention shown in Figs. 4 and 5, there is an elastic spring cushion for supporting the stationary flexible bearing member 42, just as in Figs. 1 and 2; but instead of being composed of helical springs as in Figs. 1 and 2, this cushion consists of a "pack" of corrugated spring plates 43 arranged on the base ring 44 with the corrugations of each plate at an angle of 60° counter-clockwise from those of the plate beneath it. These plates may be of sheet iron such as "armature iron" .014" thick, or of other springier metal, and when the plate is free from load the corrugations may have a height of $\frac{3}{16}$" to $\frac{3}{8}$" from valley to crest and a width of $\frac{1}{2}$" to $\frac{3}{4}$" from crest to crest. Except as it may be stiffer, this form of elastic cushion is subject to the deflection under normal load referred to in connection with Figs. 1 and 2.

The embodiment of my invention shown in Fig. 6 differs from those already described in that the stationary flexible bearing structure or member 52 is supported by a fluid cushion or pad comprising a flat, annular sheet metal chamber 53 filled with water, oil, or other liquid. The bearing member 52 is held against rotation or displacement by means of links 54 bolted to its edge and to the base ring 55. The bearing member 52 is, therefore, flexible and yieldingly supported throughout, just like the bearing member 12 of Figs. 1 and 2; but while the diffusely distributed yielding support afforded by the fluid cushion 53 is "resilient" in the sense that it will cause the member to "give and take" locally just like the bearing member 12 of Figs. 1 and 2, it is strictly "elastic" only to the extent of such free air as may chance to be in the cushion chamber. Of course this fluid cushion 53 is practically free from the "initial deflection" referred to in connection with Figs. 1 and 2.

The effect of a local concentration of pressure on any portion of the flexible bearing member 52 is to force down this portion, displace some of the fluid in the cushion 53 to a region where the bearing pressure is low, and force up this latter portion of the flexible member, thus augmenting the bearing pressure thereon until it carries its due share of the load. Thus there is an actual direct, automatic, mechanical transfer of load from one portion of the bearing surface to another; whereas in the construction of Figs. 1 and 2, etc., there is an indirect automatic transfer due to the elastic giving of the surface where the pressure is concentrated and the elastic rise of the surface where the pressure is low.

The journal bearing illustrated in Figs. 7, 8, 9, and 10 is closely analogous to the thrust bearing of Figs. 1 and 2. The shaft 71 (which in general corresponds to the rigid rotating bearing structure 11 of Fig. 1) is shown as extending through the usual two-part housing 72, 72, suitable packing 73, 73 being provided to keep out dust and dirt and keep in the lubricant. The stationary bearing box structure (which in a way corresponds to the base ring 22 of Fig. 1) is shown as made in lower and upper halves 74, 75 and as mounted in a spherical seat 76 in the housing 72. This seat 76 is intended to take care of any considerable deflection or defect in alignment of the shaft 71, etc.; ordinarily, however, the bearing itself will serve this purpose so as to allow the spherical seat to be dispensed with. The structure 74, 75 is kept from turning with the shaft 71 (without interference with its necessary shifting) by means of a key 77 whose end lies in an enlarged hole 78 in said structure.

The lower bearing structure half 74 (see Figs. 7 and 9) has three rows of closely spaced cylindrical pockets 80 for accommodating the helical springs 81 which form the elastic cushion for supporting the flexible bearing member 82. For a shaft 71 of 10" diameter, the flexible member 82 may be of $\frac{3}{16}$" boiler plate or other mild steel with a $\frac{1}{16}$" Babbitt facing. To facilitate and cheapen manufacture, the pockets 80 are bored in a separate inner half-ring portion 83 of the bearing structure half 74. Lubrication and cooling of the bearing are provided for by circumferential channels or grooves 84 in the inner face of the part 83 and holes 85 through the overlying portions of the flexible bearing member 82. Oil is forced in at an inlet 86 through the housing 72 and the structure 74, flows around through the channels 84 to the outlet 87 and out through a groove 88 in the face of the structure 75 to the spherical seat 76, and is thence drained away through other outlets (not shown).

It will be ordinarily be desired that the center of the shaft 71 should shift as little as possible, and as the particular bearing shown is intended to meet such a case, the springs 81 are shown (see Figs. 7 and 10) as pretensioned and deflected as already explained in connection with Fig. 3. If desirable, the springs 81 may be pre-tensioned unequally, according to the distribution of the normal bearing load around the semi-cylindrical bearing surface of the flexible member 82. As shown, the bearing for the springs 81 at the bottoms of the pockets 80 is on the protruding lower ends of the tension bolts 90 associated with the abutments 91, 92, instead of being directly on the abutments 91: this, because of the curvature at the bottoms of the pockets, facilitates accurate tensioning of the springs 81 and arrangement of the parts so that each spring shall do its proper share in supporting the flexible bearing member 82. These springs 81 and the abutments 91, 92 are of such diameter as to be satisfactorily guided by the walls of the pockets 80 without danger of sticking or binding.

Since the upper half 75 of the bearing structure ordinarily carries no load, it can usually be made of any preferred or approved unyielding construction, without springs,—especially when a spherical seat is provided to take care of imperfect alignment or warping of the shaft 71. As shown, said upper half 75 has a separable inner portion 93 with channels 94 corresponding to the channels 84, but without any spring pockets. On its inner face is a lining 95 similar to the flexible bearing member 82, but shown as without oil holes. Part of the lubricant supplied at the inlet 86 passes around through the upper channels 94 and serves to cool the upper half of the bearing structure.

Rotation of the parts 82, 83, 93, 95 with reference to the rest of the bearing structure 74, 75 is prevented by a pair of keys 96, 96 which lie in grooves in the edges of the upper parts 75, 93 and 95, extending in close to the shaft 71 so as to engage the parts 82, 83. These keys are kept in place by being screwed to the upper edges of the part 74. Plates 97, 97 are screwed to the sides of the parts 83, 93 and overlap the edges of the parts 74, 75, thus keeping the parts 83, 93 in place in the parts 74, 75 and minimizing oil leakage. For this last purpose other plates 98, 98, are screwed to the edges of the parts 74, 75, their inner edges extending close to the shaft 71.

What I claim as new and desire to secure by Letters Patent of the United States is:

1. A bearing comprising relatively moving bearing members in contact with one another and receiving the bearing pressure one from the other, one of said members being flexible, and supporting means associated with said latter bearing member throughout its bearing surface for automatically transferring excess pressure on any portion of such surface to other portions thereof.

2. A bearing comprising relatively moving bearing members in contact with one another and receiving the bearing pressure one from the other, one of said members being flexible, and supporting means associated with said latter bearing member affording it diffusely distributed yielding support, so that said latter bearing member may yield locally at any portion of its bearing surface.

3. A bearing comprising relatively moving bearing members in contact with one another and receiving the bearing pressure one from the other, one of said bearing members being relatively rigid and inflexible and the other being flexible and yieldingly supported throughout its bearing surface, so that it may yield locally at any point.

4. A bearing comprising relatively moving bearing members in contact with one another and receiving the bearing pressure one from the other, one of said members being flexible, and supporting means associated with said latter bearing member affording it diffusely distributed support which is firm and unyielding to the normal bearing pressure but yielding under pressure materially in excess thereof, so that under such excess pressure the said latter bearing member may yield locally at any portion of its bearing surface.

5. A bearing comprising a bearing member rotating with a shaft, a stationary bearing member in contact therewith and receiving the bearing pressure therefrom, one of said bearing members being flexible, and a cushion associated with and affording said flexible bearing member diffusely distributed resiliently yielding support, so that said flexible bearing member may give and take locally throughout its bearing surface.

6. A bearing comprising relatively moving bearing members in contact therewith and receiving the bearing pressure one from the other, one of said members being flexible, and an elastic cushion affording said latter bearing member diffusely distributed yielding support, so that said latter bearing member may give and take locally throughout its bearing surface.

7. A bearing comprising relatively moving bearing members in contact with one another and receiving bearing pressure one from the other, one of said members being flexible, and a cushion associated with and affording said latter bearing member diffusely distributed support, said cushion being firm and unyielding to the normal bearing pressure but elastically yielding to pressure materially in excess thereof, so that under such excess pressure said latter bearing member may give and take locally at any portion of its bearing surface.

8. A bearing comprising a bearing member rotating with a shaft, a stationary flexible bearing member in contact therewith and receiving the bearing pressure therefrom, and a multiplicity of springs arranged to form a cushion affording said latter bearing member diffusely distributed elastically yielding support, so that said latter bearing member may give and take locally throughout its bearing surface.

9. A bearing comprising relatively moving bearing members in contact with one another and receiving the bearing pressure one from the other, one of said members being flexible, and a multiplicity of helical springs arranged to form a cushion affording said latter bearing member diffusely distributed elastically yielding support, so that said latter bearing member may give and take locally throughout its bearing surface.

10. A bearing comprising relatively rotating bearing members in contact with one another and receiving the bearing pressure one from the other, one of said members being flexible, and supporting means, associated with the flexible member throughout its bearing surface and everywhere firm and unyielding to the normal bearing pressure, for automatically transferring excess of pressure on any portion of the bearing surface to other portions thereof.

11. A bearing comprising relatively rotating bearing members in contact with one another and receiving the bearing pressure one from the other, one of said members being flexible, and spring supporting means affording the flexible member diffusely distributed support, said spring means being confined under initial tension such that the support afforded the flexible member is firm and unyielding to the normal bearing pressure but elastically yielding to pressure materially in excess thereof, so that under such excess pressure said flexible member may give and take locally at any portion of its bearing surface.

12. A bearing comprising a bearing member rotating with a shaft, a stationary flexible bearing member in contact therewith and receiving the bearing pressure therefrom, and a multiplicity of springs arranged to form a cushion affording the flexible bearing member diffusely distributed support, the springs being individually confined under initial tension such that the cushion is firm and unyielding to the normal bearing pressure but elastically yielding to pressure materially in excess thereof, so that under such excess pressure the flexible member may give and take locally throughout its bearing surface.

13. A bearing comprising relatively rotating bearing members in contact with one another and receiving the bearing pressure one from the other, one of said members being flexible, a multiplicity of helical springs arranged to form a cushion affording the flexible bearing member diffusely distributed support, and end abutments for each individual spring interconnected to confine the spring under initial tension such that it is firm and unyielding to the normal bearing pressure but elastically yielding to pressure materially in excess thereof, so that under such excess pressure the flexible member may give and take locally throughout its bearing surface.

14. A bearing comprising a relatively rigid member having a bearing surface, a relatively flexible member having a cooperating bearing surface, and yielding means for supporting said flexible member.

15. A bearing comprising a relatively rigid member having a bearing surface, a relatively flexible member having a cooperating bearing surface, and yielding means for supporting said flexible member, at least one of said bearing members having passages through which oil may be delivered to said bearing surfaces.

16. A bearing comprising a relatively rigid member having an annular bearing surface, a co-operating bearing member consisting of a relatively thin flexible ring in bearing contact with said annular bearing surface, and yielding means for supporting said flexible ring.

17. A bearing comprising a relatively rigid member having an annular bearing surface, a co-operating bearing member consisting of a relatively thin flexible ring in bearing contact with said annular bearing surface, and yielding means for supporting said flexible ring, at least one of the bearing surfaces having apertures through which oil is delivered to the surfaces.

In witness whereof, I have hereunto set my hand this 4th day of April, 1917.

HENRY G. REIST.